United States Patent
Hosono

(10) Patent No.: US 8,396,491 B2
(45) Date of Patent: Mar. 12, 2013

(54) LOCATION INFORMATION MANAGEMENT METHOD AND NETWORK DEVICE

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/994,831

(22) PCT Filed: May 27, 2009

(86) PCT No.: PCT/JP2009/059658
§ 371 (c)(1),
(2), (4) Date: Feb. 18, 2011

(87) PCT Pub. No.: WO2009/145211
PCT Pub. Date: Dec. 3, 2009

(65) Prior Publication Data
US 2011/0136504 A1    Jun. 9, 2011

(30) Foreign Application Priority Data
May 27, 2008 (JP) .................. 2008-138597

(51) Int. Cl.
*H04Q 7/20* (2006.01)
(52) U.S. Cl. ............... 455/456.5; 455/456.1; 455/456.6; 342/427
(58) Field of Classification Search ............... 455/456.5, 455/456.1, 456.6; 342/427
See application file for complete search history.

(56) References Cited

U.S. PATENT DOCUMENTS

| | | | |
|---|---|---|---|
| 2004/0021602 A1* | 2/2004 | Weckstrom et al. | 342/427 |
| 2004/0185850 A1* | 9/2004 | Ikeda et al. | 455/435.3 |
| 2006/0089154 A1* | 4/2006 | Laroia et al. | 455/456.2 |
| 2007/0115842 A1 | 5/2007 | Matsuda et al. | |
| 2007/0232327 A1* | 10/2007 | Laroia et al. | 455/456.1 |
| 2010/0062802 A1* | 3/2010 | Amram | 455/556.1 |

FOREIGN PATENT DOCUMENTS

| | | |
|---|---|---|
| JP | 2010-514506 | 4/2012 |
| WO | 2005 057973 | 6/2005 |

OTHER PUBLICATIONS

"Requirements for LTE Home eNodeBs" Orange, Telecom Italia, T-Mobile, Vodafone, 3GPP TSG RAN #35, RP-070209, Retrieved from the Internet : < URL: ftp:// ftp.3gpp.org/ tsg_ran/TSG._RAN/ TSGR_35/Docs/RP-070209.zip> Total pp. 4, (Mar. 6-9, 2007).

International Search Report issued Jul. 21, 2009 in PCT/JP09/ 059658 filed May 27, 2009.

Notice of Grounds for Rejection issued Apr. 17, 2012 in Japanese Patent Application No. 2010-514506 (with English translation).

* cited by examiner

*Primary Examiner* — Danh Le
(74) *Attorney, Agent, or Firm* — Oblon, Spivak, McClelland, Maier & Neustadt, L.L.P.

(57) ABSTRACT

Provided is a location information management method including: step in which a mobile station acquires information on a second radio base station transmitted via a common control channel from the second radio base station while communication is performed with a first radio base station; step for transmitting the information to a radio control device; step in which the radio control device transmits a measurement instruction to the mobile station and the first radio base station if the information on the second radio base station is received; and step for deciding and managing the location information on the mobile station in accordance with the measurement result.

9 Claims, 6 Drawing Sheets

LOCATION INFORMATION MANAGEMENT METHOD AND NETWORK DEVICE

TECHNICAL FIELD

The present invention relates to a location information management method and a network device for managing location information of a mobile station.

BACKGROUND OF THE INVENTION

In a mobile communication system, generally, a radio base station for public communication is configured to constantly provide communication services to respond to connection requests made by mobile stations at random, after operation of the radio base station for public communication is started by a network operator.

The following work is supposed to be carried out, for example, when the operation of the radio base station for public communication is started by the network operator.

In a first step, the network operator (maintainer) himself/herself installs the radio base station for public communication, makes various wire connections and the like, then turns on the radio base station for public communication and opens a communication line to an upper node.

In a second step, various parameters are set in the radio base station for public communication by the network operator via a network or a manual input.

Then, after starting the operation of the radio base station for public communication with the various parameter settings reflected, the network operator causes the radio base station for public communication to provide communication services as continuously as possible without interruption unless a restart of the radio base station for public communication is required for reasons such as failure and configuration change.

Also, when removing the radio base station for public communication, the network operator turns off the radio base station for public communication after terminating the provision of communication services of the radio base station for public communication.

Although the above operation is for the radio base station for public communication, essentially the same operation is supposed to be carried out for a radio base station, called a home radio base station (Home eNB), which is installed in a small area such as a household.

SUMMARY OF THE INVENTION

However, since a user himself/herself is expected to purchase and install the home radio base station, the user is forced to carry out the work in the first and second steps described above. This causes concern that location information (installation location information) on the home radio base station may be uncertain, resulting in lowered accuracy of location information services.

The following methods and the like are conceivable as a method to resolve the above concern.

(1) A method in which a GPS function is implemented in the home radio base station and location information on the home radio base station is acquired using the GPS function.

(2) A method in which the home radio base station acquires identification information on a neighboring radio base station, transmitted via a common control channel from the neighboring radio base station, thereby acquiring location information on the home radio base station.

However, the method (1) needs to implement the GPS function in the home radio base station, while the method (2) needs to prepare a receiving function to receive the information transmitted via the common control channel from the neighboring radio base station, and hardware such as a filter.

The present invention has been made in consideration of the foregoing problems. It is an objective of the present invention to provide a location information management method and a network device, which are capable of managing with high accuracy location information on a mobile station accommodated in a home radio base station without equipping the home radio base station with means for acquiring location information on the home radio base station, such as a GPS function and a receiving function for common control channel.

A first aspect of the present invention is summarized as a location information management method for managing location information on a mobile station, the method comprise step A of acquiring, by the mobile station, information on a second radio base station transmitted via a common control channel from the second radio base station while the mobile station is in communication with a first radio base station, step B of transmitting the acquired information on the second radio base station from the mobile station to a network device, step C of transmitting measurement instructions from the network device to the mobile station and anyone of the first and second radio base stations upon receipt of the information on the second radio base station, step D of performing, by the mobile station and the one of the first and second radio base stations, measurements instructed by the measurement instructions, and reporting the measurement results to the network device, and step E of determining and managing the location information on the mobile station by the network device based on the measurement results reported by the mobile station and the one of the first and second radio base stations.

In the first aspect, wherein in the step A, the mobile station acquires the information on the second radio base station transmitted via the common control channel, by using a frequency, a transmission timing and a spreading code which are assigned for common control channel transmission at the second radio base station.

In the first aspect, wherein in the step B, the mobile station transmits, to the network device, identification information on the second radio base station and at least one of a frequency, a transmission timing and a spreading code which are assigned for common control channel transmission at the second radio base station, as the information on the second radio base station.

In the first aspect, wherein in the step C, the network device instructs the one of the first and second radio base stations, via the measurement instruction, to measure a first time lag between a transmission timing of a measurement signal to the mobile station and a reception timing of a response signal from the mobile station, and in the step C, the network device instructs the mobile station to measure a second time lag between a reception timing of the measurement signal at the mobile station and a transmission timing of a response signal at the mobile station.

In the first aspect, wherein in the step D, the one of the first and second radio base stations reports the first time lag as the measurement result to the network device, and in the step D, the mobile station reports the second time lag as the measurement result to the network device.

In the first aspect, wherein in the step E, the network device determines the location information on the mobile station based on an installation location of anyone of the first and second radio base stations, or a center location of a cell managed by any one of the first and second radio base stations, in addition to the measurement results.

A second aspect of the present invention is summarized as a network device configured to manage location information on a mobile station, comprise a measurement instruction unit configured to transmit measurement instructions to the mobile station and any one of first and second radio base stations upon receipt of information on the second radio base station acquired via a common control channel from the second radio base station by the mobile station in communication with the first radio base station, and a determination unit configured to, in a case where the mobile station and the one of the first and second radio base stations perform measurements instructed by the measurement instructions and report the measurement results to the network device, determine location information on the mobile station based on the reported measurement results.

In the second aspect, wherein the measurement instruction unit instructs the one of the first and second radio base stations, via the measurement instruction, to measure a first time lag between a transmission timing of a measurement signal to the mobile station and a reception timing of a response signal from the mobile station, and the measurement instruction unit instructs the mobile station to measure a second time lag between a reception timing of the measurement signal at the mobile station and a transmission timing of a response signal at the mobile station.

In the second aspect, wherein the determination unit determines the location information on the mobile station based on an installation location of any one of the first and second radio base stations, or a center location of a cell managed by any one of the first and second radio base stations, in addition to the measurement results.

As described above, according to the present invention, it is possible to provide a location information management method and a network device, which are capable of managing with high accuracy location information on a mobile station accommodated in a home radio base station without equipping the home radio base station with means for acquiring location information on the home radio base station, such as a GPS function and a receiving function for common control channel.

MODES FOR CARRYING OUT THE INVENTION

Configuration of Mobile Communication System According to First Embodiment of the Invention With reference to FIGS. 1 to 4, a configuration of a mobile communication system according to a first embodiment of the present invention is described.

Figure 1:
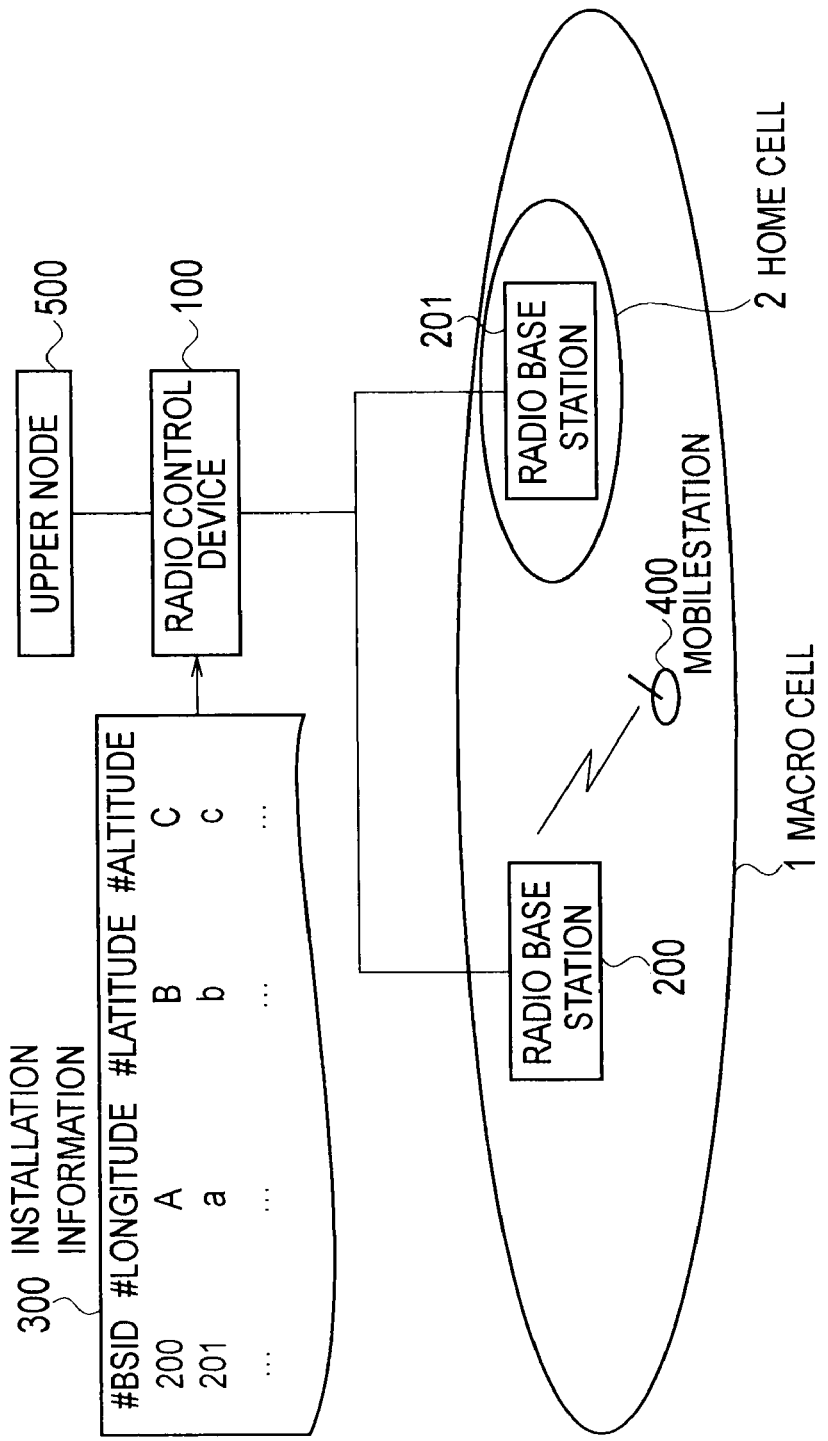
FIG. 1 is an overall configuration diagram of a mobile communication system according to a first embodiment of the present invention.

As shown in FIG. 1, the mobile communication system according to this embodiment includes an upper node 500, a radio control device (RNC: radio network controller) 100 accommodated in the upper node 500, and radio base stations (NodeB) 200 and 201 accommodated in the radio control device 100.

In this embodiment, the upper node 500 and the radio control device 100 correspond to a network device according to the present invention.

The mobile communication system according to this embodiment is configured to manage location information on a mobile station 400 and provide the location information on the mobile station 400 upon request of another mobile station or the like.

Note that the radio base station 200 (a first radio base station) is a radio base station for public communication installed by a network operator (e.g., such as a carrier), while the radio base station 201 (a second radio base station) is a home radio base station installed by a user.

Here, for the radio base station 201 that is the home radio base station, a mobile station configured to allow or restrict access to the radio base station 201 using an access list can be set.

As shown in FIG. 1, the radio control device 100 is configured to manage installation information 300 on each of the radio base stations. The installation information to be managed is an installation location (latitude, longitude, altitude) of each of the radio base stations accommodated in the radio control device 100 or a center location (latitude, longitude, altitude) of a cell managed by each of the radio base stations.

The installation information is used to detect the location information on the mobile station 400 accommodated in each of the radio base stations.

Note, however, that while the installation information on the radio base station 200 is measured by the network operator and is thus reliable, the installation information on the radio base station 201 is based on a declaration by the user and is thus less reliable.

Figure 2:
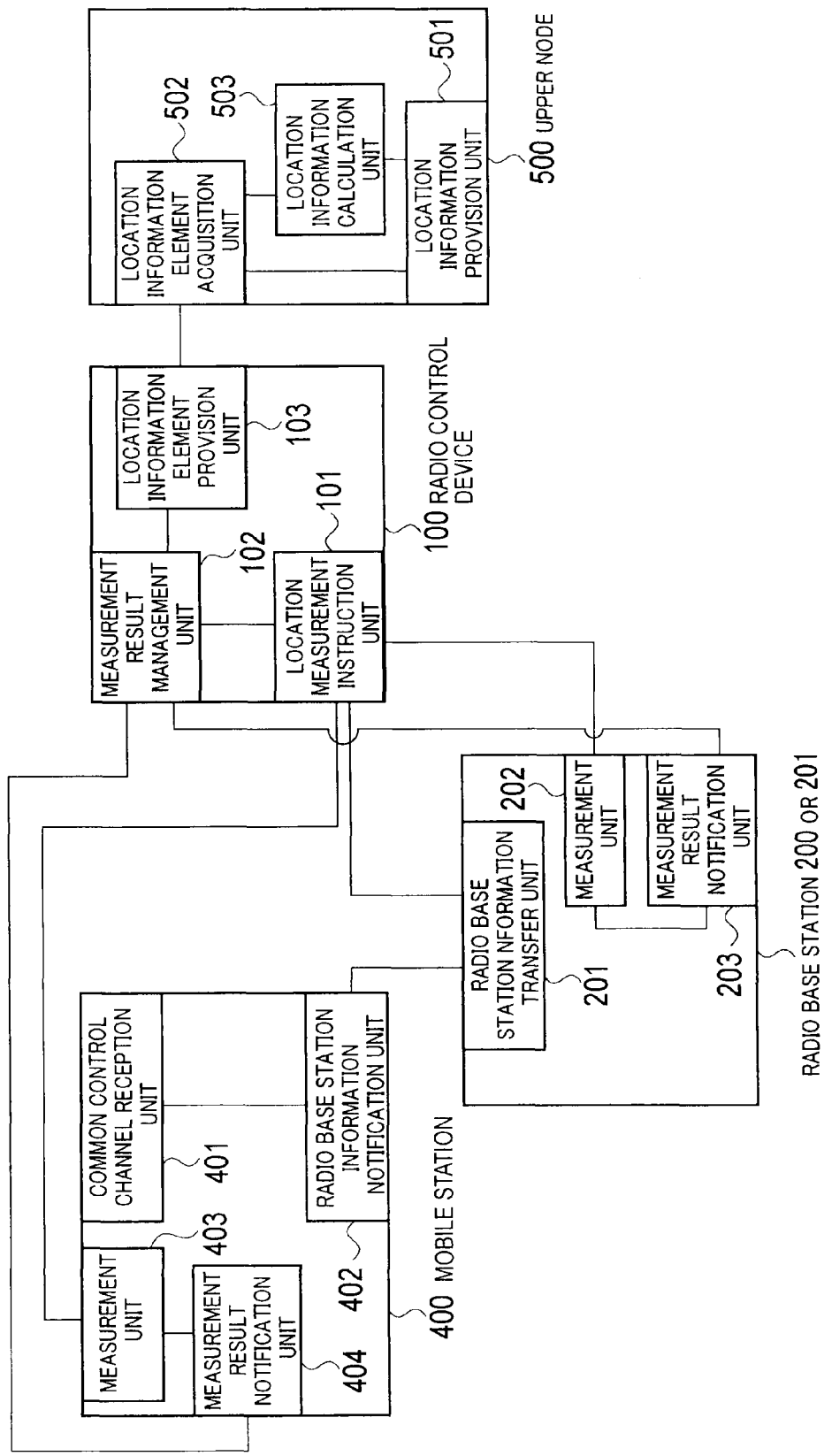
FIG. 2 is a functional block diagram of units included in the mobile communication system according to the first embodiment of the present invention.

To be more specific, as shown in FIG. 2, the radio control device 100 includes a location measurement instruction unit 101, a measurement result management unit 102, and a location information element provision unit 103.

The location measurement instruction unit 101 is configured to transmit measurement instructions to the mobile station 400 and the radio base station 200 or 201 upon receipt of information on the radio base station 201 (the second radio base station) from the mobile station 400 via the radio base station 200 or 201.

Here, the information on the radio base station 201 (the second radio base station) includes identification information (BSID) on the radio base station 201 and at least one of a frequency, a transmission timing and a spreading code, which are assigned for common control channel transmission at the radio base station 201.

Figure 3:
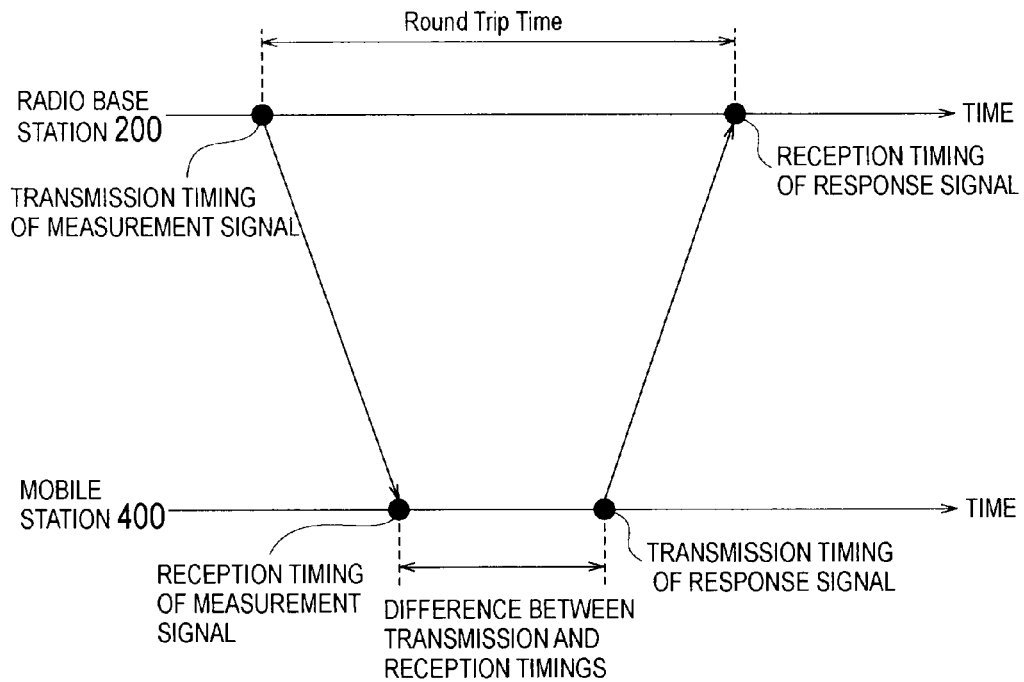
FIG. 3 is a diagram for explaining the principle of measurement of delay time between a mobile station and a radio base station in the mobile communication system according to the first embodiment of the present invention.

Moreover, the location measurement instruction unit 101 instructs the radio base station 200 or 201, via the measurement instruction described above, to measure a first time lag (Round Trip Time) between a transmission timing of a measurement signal to the mobile station 400 and a reception timing of a response signal from the mobile station 400 (see FIG. 3).

At the same time, the location measurement instruction unit 101 instructs the mobile station 400 to measure a second time lag (difference between transmission and reception timings) between a reception timing of a measurement signal at the mobile station 400 and a transmission timing of a response signal at the mobile station 400 (see FIG. 3).

The measurement result management unit 102 is configured to receive and manage measurement results (e.g., the first time lag and the second time lag) reported by the mobile station 400 and the radio base station 200 or 201.

The location information element provision unit 103 is configured to provide, to the upper node 500, the measurement results managed by the measurement result management unit 102, as location information elements, upon request of the upper node 500.

Here, the location information element provision unit 103 is configured to also provide, to the upper node 500, the installation information on the radio base station described above as the location information element.

Meanwhile, as shown in FIG. 2, the radio base station 200 or 201 includes a radio base station information transfer unit 201, a measurement unit 202 and a measurement result notification unit 203.

The radio base station information transfer unit 201 is configured to transfer the information on the radio base station 201 transmitted from the mobile station 400 to the radio control device 100. Note that the radio base station 201 need not include the radio base station information transfer unit 201.

The measurement unit 202 is configured to perform measurement specified by the measurement instruction received from the radio control device 100.

For example, as shown in FIG. 3, the measurement unit 202 is configured to measure the first time lag (Round Trip Time) described above.

The measurement result notification unit 203 is configured to transfer the measurement result (e.g., the first time lag) obtained by the measurement unit 202 to the radio control device 100.

Meanwhile, as shown in FIG. 2, the mobile station 400 includes a common control channel reception unit 401, a radio base station information notification unit 402, a measurement unit 403 and a measurement result notification unit 404.

The common control channel reception unit 401 is configured to acquire information on the radio base station 201 (the second radio base station) transmitted via a common control channel from the radio base station 201 (the second radio base station) while the mobile station 400 is in communication with the radio base station 200 (the first radio base station).

To be more specific, the common control channel reception unit 401 is configured to acquire the information on the radio base station 201 (the second radio base station) transmitted via the common control channel, by using the frequency, the transmission timing and the spreading code, which are assigned for common control channel transmission at the radio base station 201 (the second radio base station).

The radio base station information notification unit 402 is configured to transmit the information on the radio base station 201 (the second radio base station) acquired by the common control channel reception unit 401 to the radio control device 100 via the radio base station 200 (the first radio base station).

The measurement unit 403 is configured to perform measurement specified by the measurement instruction received from the radio control device 100.

For example, as shown in FIG. 3, the measurement unit 403 is configured to measure the second time lag (difference between transmission and reception timings) described above.

The measurement result notification unit 404 is configured to transfer the measurement result, e.g. the second time lag, obtained by the measurement unit 403 to the radio control device 100.

Meanwhile, as shown in FIG. 2, the upper node 500 includes a location information element acquisition unit 501, a location information calculation unit 502 and a location information provision unit 503.

The location information element acquisition unit 501 is configured to acquire location information elements associated with the mobile station 400 by transmitting a location information element request to the radio control device 100 in response to a location information request on the mobile station 400 transmitted from any mobile station or the like. Specifically, the location information element request demands transmission of information (location information elements) required for calculation of the location information on the mobile station 400.

Here, the location information elements include the installation information on the radio base station in which the mobile station 400 is accommodated, the first and second time lags described above, and the like.

The location information calculation unit 502 is configured to determine and manage the location information on the mobile station 400 in accordance with the location information elements (including the measurement results) acquired by the location information element acquisition unit 501.

Here, the location information calculation unit 502 may be configured to determine the location information on the mobile station 400 based on an installation location of the radio base station 200 or 201, or a center location of a cell managed by the radio base station 200 or 201, in addition to the measurement results described above.

To be more specific, the location information calculation unit 502 calculates a delay time between the mobile station 400 and the radio base station 200 or 201 by subtracting the second time lag described above from the first time lag described above.

Figure 4:
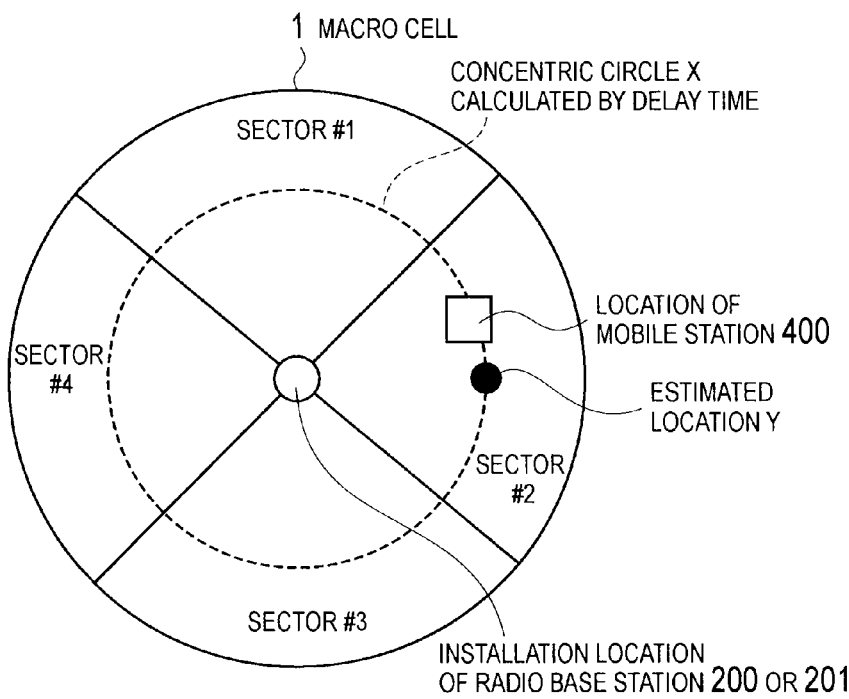
FIG. 4 is a diagram for explaining the principle of estimation of location information on the mobile station in the mobile communication system according to the first embodiment of the present invention.

The location information calculation unit 502 then calculates a midpoint Y of an arc obtained by dividing a concentric circle X (whose center is the installation location of the radio base station 200 or 201), which is specified by the delay time, by a sector #2 in which the mobile station 400 resides, and estimates the midpoint Y to be the location information on the mobile station 400, as shown in FIG. 4.

The location information provision unit 503 is configured to provide the location information on the mobile station 400 determined by the location information calculation unit 502 to any given mobile station or the like that is a source of the location information request described above.

Figure 5:
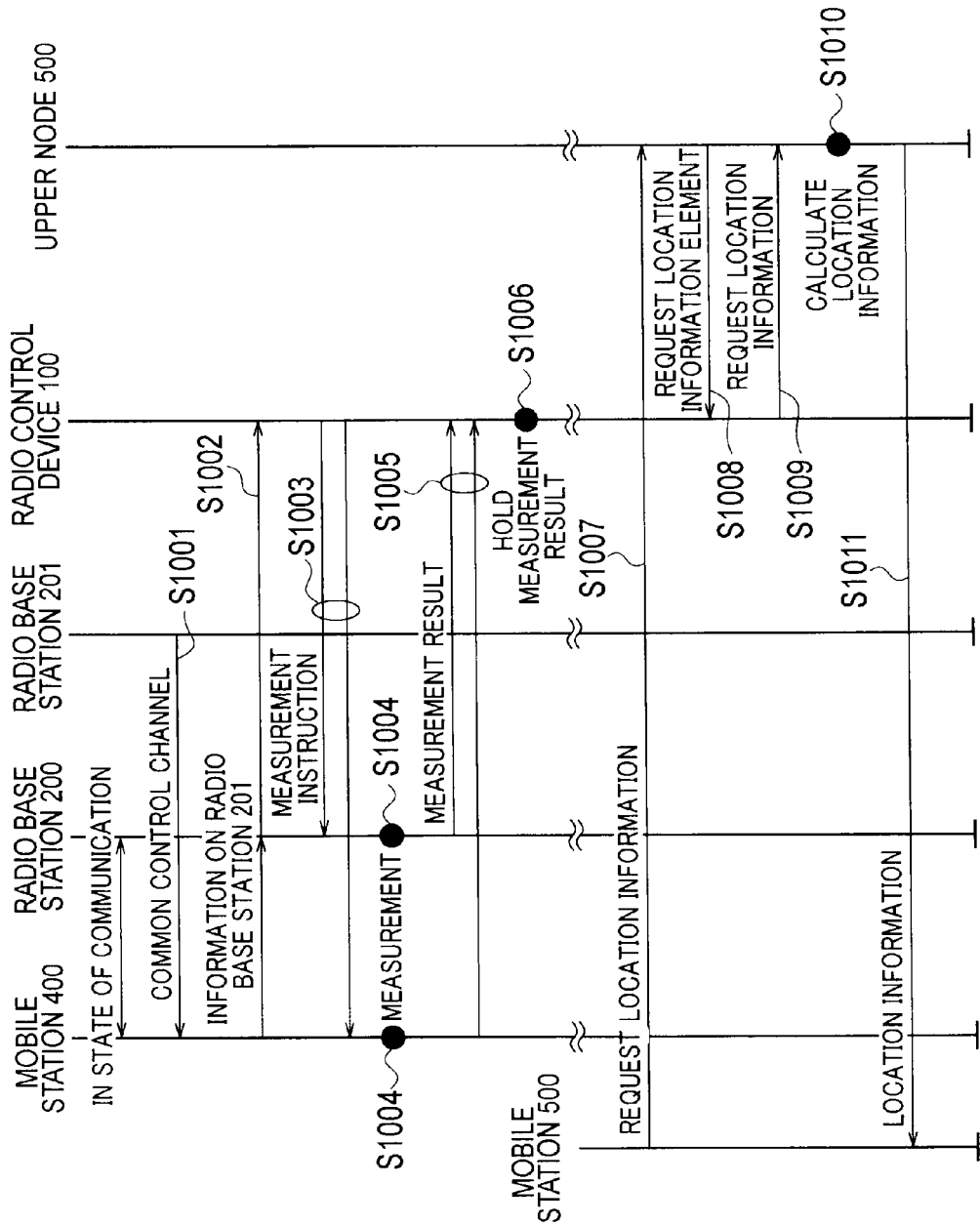
FIG. 5 is a sequence diagram showing operations of the mobile communication system according to the first embodiment of the present invention.

Operations of Mobile Communication System
According to First Embodiment of the Invention With reference to FIG. 5, operations of the mobile communication system according to the first embodiment of the present invention are described.

As shown in FIG. 5, in Step S1001, the mobile station 400 in communication with the radio base station 200 (the first radio base station) acquires information on the radio base station 201 (the second radio base station) transmitted via the common control channel from the radio base station 201 (the second radio base station).

In Step S1002, the mobile station 400 notifies the radio control device 100 of the information on the radio base station 201 via the radio base station 200.

In Step S1003, upon receipt of the information on the radio base station 201, the radio control device 100 instructs the radio base station 200 (or the radio base station 201) to measure the first time lag (Round Trip Time) described above, and instructs the mobile station 400 to measure the second time lag (difference between transmission and reception timings) described above.

In Step S1004, the radio base station 200 (or the radio base station 201) and the mobile station 400 measure the first time lag and the second time lag, respectively, in accordance with the measurement instructions received.

In Step S1005, the radio base station 200 (or the radio base station 201) and the mobile station 400 notify the radio control device 100 of the measurement results (the first time lag and the second time lag), respectively.

In Step S1006, the radio control device 100 holds the received measurement results (the first time lag and the second time lag) and the installation information on the radio base station 200 as location information elements for calculating the location information on the mobile station 400 in communication with the radio base station 201.

In Step S1007, after the mobile station 400 has started communicating with the radio base station 201, a mobile station 500 transmits to the upper node 500 a location information request demanding the location information on the mobile station 400 (a user having the mobile station 400).

In Step S1008, the upper node 500 transmits to the radio control device 100 a location information element request demanding transmission of location information elements required for calculation of the location information on the mobile station 400.

In Step S1009, the radio control device 100 transmits to the upper node 500 the location information elements associated with the mobile station 400, which are held in Step S1006, in response to the location information element request received.

In Step S1010, the upper node 500 uses the received location information elements to calculate the location information (latitude and longitude) on the mobile station 400 in communication with the radio base station 201.

In Step S1011, the upper node 500 provides the calculated location information on the mobile station 400 to the mobile station 500.

Note that an area (cell) managed by the home radio base station generally needs only to cover the user's house, and thus is formed to be a very small area. Therefore, the location information on the mobile station 400 at the point in time when the mobile station 400 has received the information on the radio base station 201 via the common control channel from the radio base station 201 can be regarded as approximately the same as the location information on the mobile station 400 in the state of communicating with the radio base station 201.

Moreover, in the sequence shown in FIG. 5, the description has been given of the case where the mobile station 400 has received the information on the radio base station 201 via the common control channel from the radio base station 201 while the mobile station 400 is in the state of communicating with the radio base station 200. However, the present invention is not limited thereto.

For example, when the mobile station 400 in the state of communicating with the radio base station 201 has received the information on the radio base station 200 via the common control channel from the radio base station 200, the radio control device 100 can acquire the location information on the mobile station 400 in the state of communicating with the radio base station 201 by transmitting the measurement instructions described above to the radio base station 200 and the mobile station 400 immediately after the mobile station 400 performs a handover to the radio base station 200.

Advantageous Effects of Mobile Communication System According to First Embodiment of the Invention In the mobile communication system according to the first embodiment of the present invention, the network device can calculate the location information on the home radio base station 201 based on the delay time between the mobile station 400 and the radio base station 200 for public communication (or the home radio base station 201), the mobile station 400 being in the state of being able to receive the information transmitted via the common control channel from the home radio base station 201. Thus, the location information on the mobile station 400 in the state of communicating with the home radio base station 201 can be managed with high accuracy without implementing, in the home radio base station 201, a GPS function, a receiving function for common control channel reception, and the like.

Modified Example 1

Figure 6:
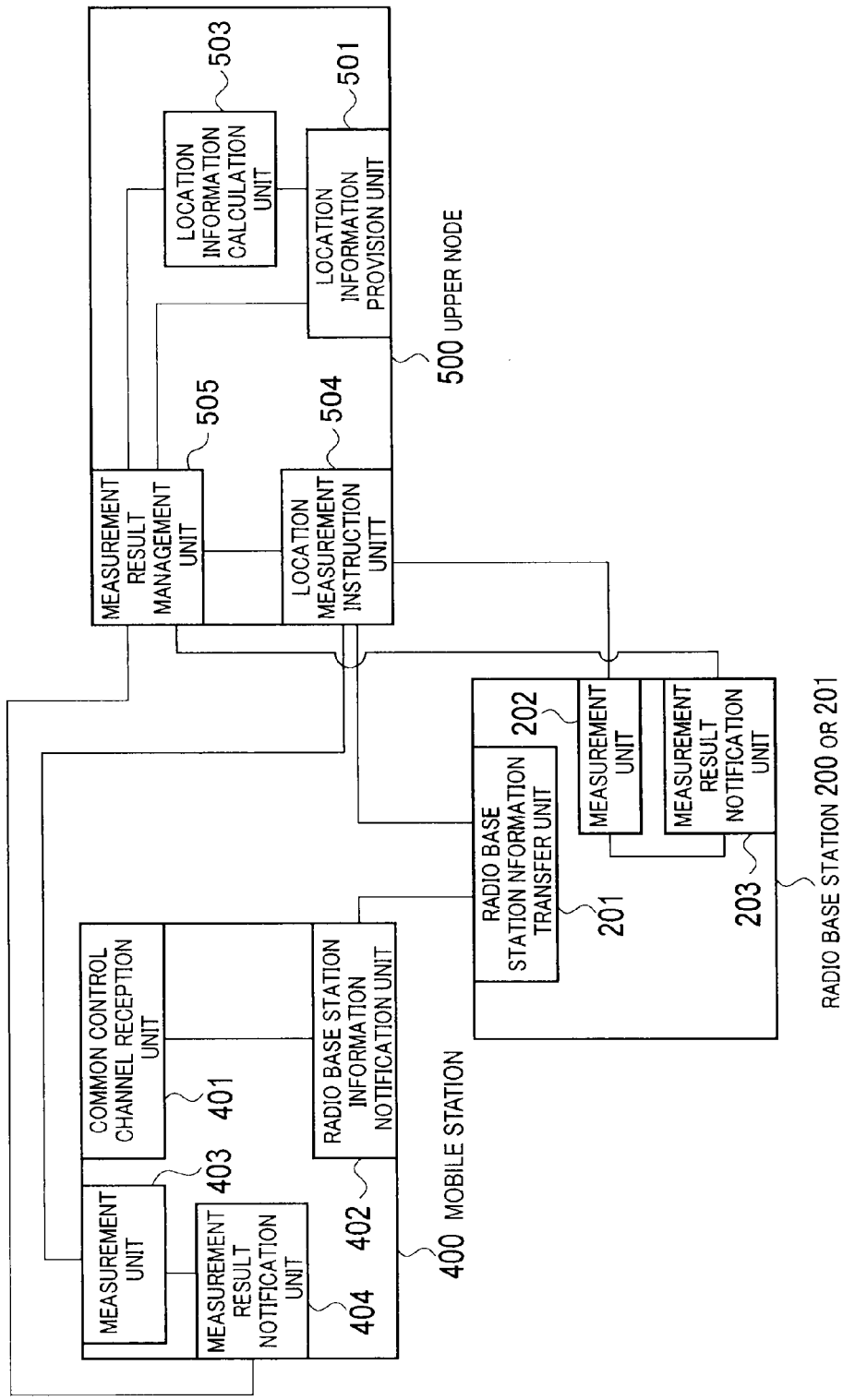
FIG. 6 is an overall configuration diagram of a mobile communication system according to Modified Example 1 of the present invention.

Although the description has been given by taking the W-CDMA mobile communication system as an example in the above embodiment, the present invention is not limited to the above mobile communication system but is also applicable to, for example, an LTE (Long Term Evolution) mobile communication system as shown in FIG. 6.

In this case, some functions (e.g., a location measurement instruction unit 504, a measurement result management unit 505, and the like) of the radio control device 100 described above may be mounted in the upper node 500 (an exchange MME).

Here, in this modified example, the exchange MME is configured to serve as the network device described above.

Modified Example 2

Figure 7:
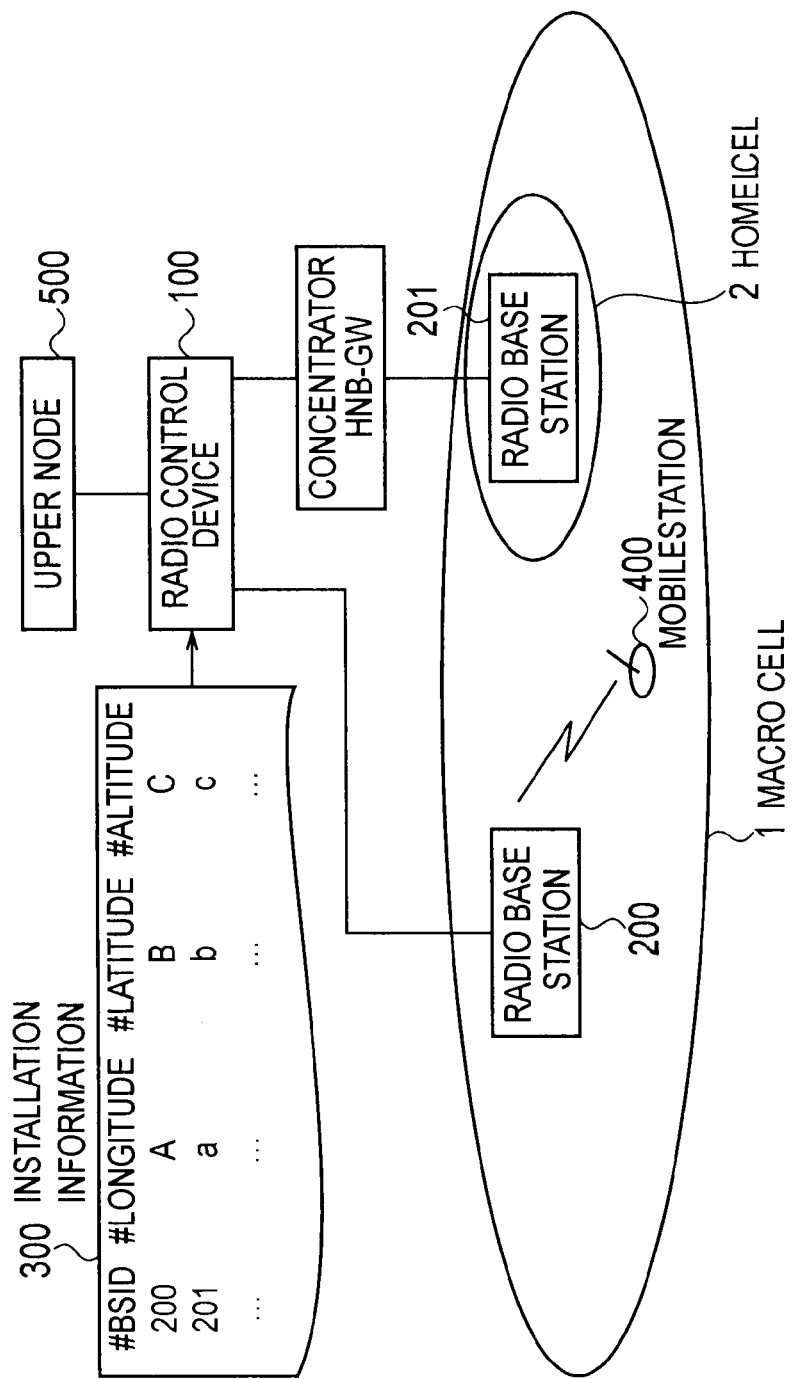
FIG. 7 is an overall configuration diagram of a mobile communication system according to Modified Example 2 of the present invention.

With reference to FIG. 7, a mobile communication system according to Modified Example 2 of the present invention is described. Hereinafter, the mobile communication system according to Modified Example 2 of the present invention is described while focusing on differences from the mobile communication system according to the first embodiment of the present invention.

As shown in FIG. 7, the mobile communication system according to Modified Example 2 of the present invention is a W-CDMA mobile communication system, and includes: an upper node 500; a radio control device 100 accommodated in the upper node 500; an concentrator HNB-GW and a radio base station 200, which are accommodated in the radio control device 100; and a radio base station 201 accommodated in the concentrator HNB-GW.

In this case, some functions (e.g., a location measurement instruction unit 504, a measurement result management unit 505, and the like) of the radio control device 100 described above may be mounted in the concentrator HNB-GW.

Moreover, the concentrator HNB-GW may be accommodated in the upper node 500.

Note that operation of the above described the mobile station 400, the radio base stations 200 and 201, the upper node 500, the radio control device 100 and the concentrator HNB-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station 400, the radio base stations 200, 201, the upper node 500, the radio control device 100 and the concentrator HNB-GW. Also, the storage medium and the processor may be provided in the mobile station 400, the radio base stations 200, 201, the upper node 500, the radio control device 100 and the concentrator HNB-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A location information management method for managing location information on a mobile station, the method comprising:
    step A of acquiring, by the mobile station, information on a second radio base station transmitted via a common control channel from the second radio base station while the mobile station is in communication with a first radio base station;
    step B of transmitting the acquired information on the second radio base station from the mobile station to a network device;
    step C of transmitting measurement instructions from the network device to the mobile station and any one of the first and second radio base stations upon receipt of the information on the second radio base station;
    step D of performing, by the mobile station and the one of the first and second radio base stations, measurements instructed by the measurement instructions, and reporting the measurement results to the network device; and
    step E of determining and managing the location information on the mobile station by the network device based on the measurement results reported by the mobile station and the one of the first and second radio base stations.

2. The location information management method according to claim 1, wherein
    in the step A, the mobile station acquires the information on the second radio base station transmitted via the common control channel, by using a frequency, a transmission timing and a spreading code which are assigned for common control channel transmission at the second radio base station.

3. The location information management method according to claim 1, wherein
    in the step B, the mobile station transmits, to the network device, identification information on the second radio base station and at least one of a frequency, a transmission timing and a spreading code which are assigned for common control channel transmission at the second radio base station, as the information on the second radio base station.

4. The location information management method according to claim 1, wherein
    in the step C, the network device instructs the one of the first and second radio base stations, via the measurement instruction, to measure a first time lag between a transmission timing of a measurement signal to the mobile station and a reception timing of a response signal from the mobile station, and
    in the step C, the network device instructs the mobile station to measure a second time lag between a reception timing of the measurement signal at the mobile station and a transmission timing of a response signal at the mobile station.

5. The location information management method according to claim 4, wherein
    in the step D, the one of the first and second radio base stations reports the first time lag as the measurement result to the network device, and
    in the step D, the mobile station reports the second time lag as the measurement result to the network device.

6. The location information management method according to claim 1, wherein
    in the step E, the network device determines the location information on the mobile station based on an installation location of any one of the first and second radio base stations, or a center location of a cell managed by any one of the first and second radio base stations, in addition to the measurement results.

7. A network device configured to manage location information on a mobile station, comprising:
    a communication interface that receives, from a mobile station, information on a second radio base station acquired via a common control channel from the second radio base station by the mobile station in communication with a first radio base station;
    a measurement instruction unit configured to transmit measurement instructions to the mobile station and any one of the first and second radio base stations upon receipt of the information on the second radio base station from the mobile station; and
    a determination unit configured to, in a case where the mobile station and the one of the first and second radio base stations perform measurements instructed by the measurement instructions and report the measurement results to the network device, determine location information on the mobile station based on the reported measurement results.

8. The network device according to claim 7, wherein
    the measurement instruction unit instructs the one of the first and second radio base stations, via the measurement instruction, to measure a first time lag between a transmission timing of a measurement signal to the mobile station and a reception timing of a response signal from the mobile station, and the measurement instruction unit instructs the mobile station to measure a second time lag between a reception timing of the measurement signal at the mobile station and a transmission timing of a response signal at the mobile station.

9. The network device according to claim 7, wherein
the determination unit determines the location information on the mobile station based on an installation location of any one of the first and second radio base stations, or a center location of a cell managed by any one of the first and second radio base stations, in addition to the measurement results.

* * * * *